US005822712A

United States Patent [19]

Olsson

[11] Patent Number: 5,822,712

[45] Date of Patent: Oct. 13, 1998

[54] PREDICTION METHOD OF TRAFFIC PARAMETERS

[76] Inventor: Kjell Olsson, Saningsvagen 17, S-175 45 Jarfalla, Sweden

[21] Appl. No.: 939,580

[22] PCT Filed: Nov. 11, 1993

[86] PCT No.: PCT/SE93/00962

§ 371 Date: Jul. 20, 1995

§ 102(e) Date: Jul. 20, 1995

[87] PCT Pub. No.: WO94/11839

PCT Pub. Date: May 26, 1994

Related U.S. Application Data

[63] Continuation of Ser. No. 436,301, Jul. 20, 1995, abandoned.

[30] Foreign Application Priority Data

Nov. 19, 1992 [SE] Sweden .................................. 9203474

[51] Int. Cl.[6] .................................................. G06F 163/00

[52] U.S. Cl. ............................................ 701/117; 340/934

[58] Field of Search .................................... 701/117, 118, 701/119; 340/933, 934, 936, 937, 942

[56] References Cited

U.S. PATENT DOCUMENTS

| | | | |
|---|---|---|---|
| 4,370,718 | 1/1983 | Chasek | 364/438 |
| 4,390,951 | 6/1983 | Marcy | 364/438 |
| 5,257,194 | 10/1993 | Sakita | 364/437 |
| 5,289,183 | 2/1994 | Hassett et al. | 364/436 |
| 5,444,442 | 8/1995 | Sadakata et al. | 364/438 |
| 5,566,072 | 10/1996 | Momose et al. | 364/438 |

OTHER PUBLICATIONS

Baras, J.S. et al. "Filtering techniques for urban traffic data" Proceedings of the 1976 IEEE Conference on Decision and Control including the 15th Symposium on Adaptive Processes. 1976, New York, NY, USA. see page 1297–1298.

*Primary Examiner*—Gary Chin
*Attorney, Agent, or Firm*—Hill & Simpson

[57] ABSTRACT

The invention relates to a method for predicting the traffic flow in a road network. Sensors in the road network register the passage of vehicles and two of the parameters, flow, density, speed enable all three parameters to be calculated. The correlation between the traffic at a point X at a certain time and the traffic at another point Y some period τ later can in certain cases and under certain conditions provide good values. In these cases, the traffic can also be predicted with good precision. The invention utilizes this fact and relates the prediction factor to the correlation coefficient. The invention also uses the methods to divide a traffic parameter into various frequency components to be used in various situations and improves the prediction by using the corresponding prediction factor for the corresponding frequency components of the traffic parameters. For the prediction, sensor information from different links is used in some cases to provide a quicker and more effective prediction by means of cooperation. The method for providing this cooperating also belongs to the invention. In certain sensor-lean situations, the prediction factor described previously is supplemented with a propagation factor W that describes the traffic changes along a traffic link, and where W can be defined and adapted to the various frequency components of a traffic parameter.

31 Claims, 2 Drawing Sheets

PREDICTION METHOD OF TRAFFIC PARAMETERS

This is a continuation of application Ser. No. 08/436,301, filed Jul. 20, 1995, now abandoned.

FIELD OF THE INVENTION

The present invention relates to a method for determining the state of vehicle traffic along traffic routes and road networks. The method can also be applied to predict traffic states with the aid of the latest measuring data obtained and earlier measured values. Prediction is important, since it creates conditions which enables appropriate measures and procedures to be adopted and the traffic to be controlled in a manner to avoid immanent traffic problems. Prediction is also important from the aspect of vehicle or transport control, in which route planning and the selection of the best roads at a particular time is effected preferably with respect to futuristic traffic situations when the vehicles concerned are located on respective road sections.

Incidents and events that occur can also have a great influence on prevailing traffic, and a prediction of a change in traffic flow will provide a basis on which to make a decision as to which control measures should be taken, for instance by broadcasting information over the radio or through the medium of changeable road signs.

Various methods of determining traffic flows are known to the art. The OD-matrix based methods have long been used to calculate traffic flows under different circumstances and in a long-term future perspective. These methods are used, for instance, in city-planning projects, road planning, etc., and the futuristic perspective can apply for several years.

OD stands for Origin Destination and an OD-matrix which describes how many vehicles are driven from an origin O to a destination D per unit of time and the routes used by these vehicles can be generated by using the knowledge edge of domestic areas, work places, travel habits, etc., and by measuring the traffic flows.

The information basic to OD-matrices is difficult to obtain. For instance, the method is used to produce the average values over a period of one year, and the accuracy can be improved successively by calibrating the assigned values with regard to the values actually measured.

Those predictions with which the present invention is concerned are predictions which cover much shorter time periods, for instance time periods of from 1–3 minutes up to the nearest hour, and with successively less precision for the nearest day. Historically typical traffic curves which are modified with regard to known obstructions, interference, road works, etc. are used in the case of time periods longer than one calendar day. The nature of traffic is such that the best way of predicting traffic over a long time perspective is to say that the traffic will be as usual at the time of the day, on that week day, at that time of year, and so on. To this end, it is essential to take many measurements and to store significant average values for traffic on the road network links for different time periods. Such a data base can also be used conveniently together with the present invention.

The use of OD-matrices has also been discussed for short time perspectives, such as those applicable to the present invention. This is encumbered with a number of problems. A great deal of work is involved in defining different OD-matrices for each short time period of the day. At present, there is no reasonable assaying or measuring method which assays the origins of the vehicles, the destinations of the vehicles and the routes travelled by the vehicles. Methods of enabling the journeys of individual vehicles from O to D to be identified and followed have been discussed. A traffic control system in which all vehicles report to a central their start and destination and also their successive respective positions during their journeys has also been proposed.

SUMMARY OF THE INVENTION

Present-day measuring sensors can be used when practicing the present invention. Another fundamental principle of the invention is one in which the parameter values used are constantly adapted to the current measurement values, so that the system will automatically endeavour to improve its accuracy and adapt itself successively to changes in travel patterns, traffic rhythms, road networks, and so on.

Many mathematical processes have earlier been tested on different traffic problems. In this regard, misunderstanding with regard to the nature of the traffic and the inherent stochastic character of the traffic is not unusual. More advanced methods and more comprehensive calculations are unable to predict traffic more precisely than those limits that are set by the "noisiness" of the traffic. If a parallel with electronic measuring techniques is drawn, this would be similar to attempting to obtain more signal from electronic noise by using more finely-tuned methods.

Once having accepted that noise is noise, this knowledge can be very useful. It enhances the understanding of how traffic can be managed and predicted. The parameter values used to characterize noise include, for instance, the average values and variances that can be calculated from the noise distribution function. Naturally, there is nothing wrong in using qualified methods such as the Kalman filtration method for instance, which can also be applied in the present invention. It is essential that the methods are used for the right type of problem and with an adapted model of reality.

Vehicle traffic simulating programs have also been developed. These problems are often used when dimensioning street crossings, slip-ways to and from highways, motorways, etc. The stochastic nature of the traffic is expressed here by using random number generation to randomly select the positions and start times of individual vehicles, driver behaviour factors, etc.

The result obtained is one example of the possible state of the traffic, depending on the model and the randomly selected parameters applied. It is possible to obtain some idea of how the traffic tends to flow in a road crossing or road intersection, for instance, with a larger number of simulations, and therewith modify the road crossing or road intersection already at the planning stage.

As will be apparent from the above example, this type of simulation will exemplify the possible futuristic state of the traffic. This shall be compared with a prediction which is required to provide a solution that lies within the most probable result area, including an understanding of relevant variancies.

BRIEF DESCRIPTION OF THE DRAWING FIGURES

The invention will now be described in more detail with reference to the accompanying drawings, in which FIG. 1*a* illustrates a simple model of a control centre having only one operator site;

FIG. 1*b* illustrates an example of a control unit included in the traffic model unit;

DETAILED DESCRIPTION OF THE PREFERRED EMBODIMENTS

Figure 1A:
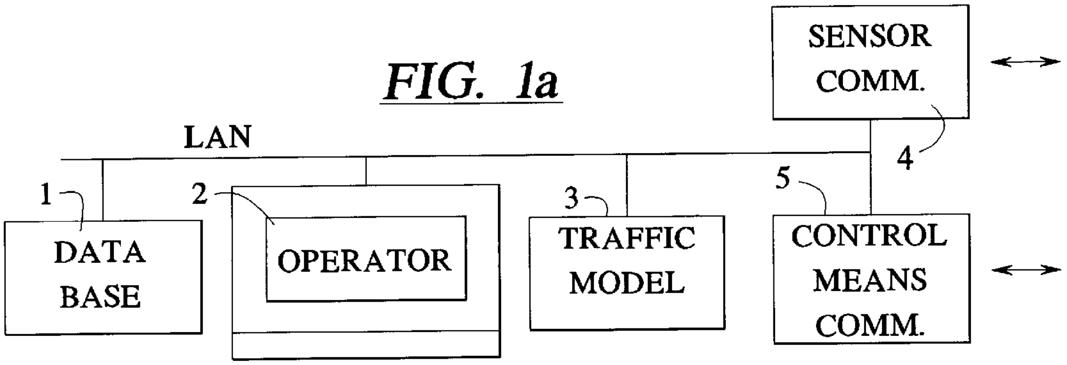

The present invention will be described first with reference to an exemplifying embodiment thereof in which simplicity in both description and construction has been given priority so as to facilitate an understanding of the fundamental nature of the invention. This initial description will then be followed by a detailed description of other embodiments. This is done with the intention providing a pedagogical explanation rather than giving priority to the merits of the invention.

Implementation of the invention is based on the availability of measuring sensors. Since measuring sensors can represent a large part of the costs involved, embodiments are also included in which the road network has a low sensor density, while still enabling the system to produce useful information, although perhaps less precise and with a higher error probability in the predictions.

A Simple Example of One Embodiment

The traffic situation in and close to large towns and cities represents one example of the area in which the invention can be used. In this case, the road network is divided into different parts or sections having different properties or qualities and of different significance from a traffic technical aspect.

A. Large traffic routes—for traffic entering and leaving the city.

B. Traffic arterial roads—for large flows of traffic in the city.

C. Regional networks—connected networks of streets and roads within a relatively unitary region from a traffic aspect.

D. Other traffic routes

E. Narrow roads and streets of less importance from a traffic technical aspect.

Determining Traffic on Large Traffic Routes

The traffic is preferably measured with regard to two of the following parameters:

I=cars/s

P=cars/m v=m/s, wherein the third parameter is obtained from $$I=P\cdot v.$$

One interesting task is to predict the traffic on a link A on a traffic route on the basis of measurements obtained by sensors on a link B upstream of the traffic route.

The basic concept is that the vehicle traffic in B will reach A after a time lapse of $t_1$ and that it is therefore possible to anticipate the traffic in A while using the time allowance of $t_1$.

However, a number of relevant complications occur, which are not normally observed.

For instance, assume that the sensor on link B is located at a time distance of 5 minutes upstream of A. Given that A is equipped with a measuring sensor, it may be found that a given correlation exists between the measurement values in B and those obtained 5 minutes later in A. This does not mean, however, that by measuring traffic in B, it is possible to predict the traffic in A after a lapse of 5 minutes. Five minutes travelling time at a speed of 20 m/s (roughly 70 km/h) implies that the distance covered will be 6 km. This distance will normally include several exit roads and entry roads close to cities and measuring times in the order of five minutes are usual in order for variances in the measurements not to be large. But if the measuring time is five minutes, this will mean that the first vehicles included in the measurement will already have arrived at A before the measuring process is terminated. If this five-minute prediction is required in order to gain time in which to control the traffic, it is apparent that in the illustrated example a measuring sensor must be placed at a travel distance of 10 minutes from A. This implies a distance of 1.2 metric miles from A, and there are often many factors which influences the traffic during a travel distance of such length, which means that a "one to one" relation between the traffic in B and the traffic in A cannot be expected.

The following implications thus arise:

If the measuring sensor is placed close to A so as to obtain good correlation with the measurement values in B, no prediction time is obtained since this prediction time is consumed by the measuring time. If the sensor is placed far away from A, so as to obtain prediction time, the correlation level is lost.

In the case of the present invention, there is formed the relationship $$I_0+I_1+I_2$$

$$P=P_0+P_1+P_2$$

where $I_2$ is an average value of the time interval $T_2$ superimposed on $I_0$ and $I_1$;

$I_1$ is an average value of the time interval $T_1$ superimposed on $I_0$; and $I_0$ is an average value of the time interval $T_0$.

Examples of the values are $T_2$=30 s $T_1$=3 min.

$T_0$=15 min.

For the sake of simplicity, $I_0$ can be calculated successively as the approximation $$I_0(t+T_2)=I_0(t)+\frac{I(t+T_2)-I_0(t)}{T_0/T_2}$$

and $$I_1(t+T_2)=I_1(t)+\frac{I(t+T_2)-I_0(t+T_2)-I_1(t)}{T_1/T_2}$$

and $$I_2(t+T_2)=I(t+T_2)-I_0(t+T_2)-I_1(t+T_2)$$

The density values $P_0$, $P_1$ and $P_2$ are calculated in a corresponding manner. The advantage afforded by dividing the flow into three different time components has strong affinity with the object of the invention.

When the measuring taken indicate low I-values and P-values and speeds, v, close to the link permitted speeds, this will normally mean that traffic is moving well and that there is a good margin before the traffic capacity value of the link is reached. In this case, the need to produce highly accurate values is not very pronounced. Traffic management information that is of interest is the expected travel time per link, and when traffic flows with a good margin to the traffic capacity of the link, the link time $t_L=L/v_L$, where L is the length of the link and $v_L$ is the basic link speed, which corresponds approximately to the link speed limit.

In the case of the majority of road links, the link time=$t_L$ will apply in most cases over a twenty-four hour period. The link time can therefore be easily predicted.

It is not until traffic becomes denser and approaches the capacity of the link that more comprehensive analyses are required. (Some exceptions in this regard will be presented later.)

Those instances initially studied here involve situations in which the traffic flow approaches traffic capacity somewhere along the traffic route.

Case a. $I_0$ and $I_1$ are small, $I_2$ is large. This implies a single high density vehicle batch over a short period of time equal to $T_2$.

Since $I_0$ and $I_1$ are small, the risk of large traffic congestions or traffic jams is also small and there is therefore no need for a more accurate analysis. If v is small and when $I_2$ is large, this will indicate a small tail-back behind a slow vehicle and it may be of value to follow the development of $I_2$ along the traffic route.

Case b. $I_0$ is large.

This implies that the average flow is high over a long time period and that consequently single disturbances can quickly result in traffic congestions. The traffic flow is also characterized by the fact that vehicle density tends to increase and vehicle speed to drop as the traffic flow reaches the capacity of the link concerned.

Case c. $I_1$ is large, $I_0$ is small.

$I_1$ indicates a long period of high traffic flow. If $P_1$ is high and v is low, there is a long vehicle tail-back which affects link times and can cause traffic congestions at the approach roads to the traffic route, for instance.

Division of the traffic flows and traffic densities into different components is also favourable in predicting traffic flows. Correlations are an important function in the prediction of traffic flows. We know from experience that the city entry roads and city exit roads are heavily trafficated during the morning and evening rush hour periods, corresponding to working times, and a good correlation between different entry roads can be expected with regard to traffic developments in the morning rush hours.

This correlation applies for the terms $I_0$ and $P_0$, whereas $I_1$, $P_1$ will probably have lower correlation, and primarily $I_2$, $P_2$ should not exhibit any appreciable correlation between different roads or traffic routes.

Traffic Relationship Between Different Traffic Routes

Good correlation is expected between different approach roads or entry routes of mutually the same type with regard to traffic developments during the morning hours. Good correlation is also expected between traffic as it is, for instance, on a Tuesday on one traffic route with how the traffic usually behaves on Tuesdays on the same route.

We are thus able to identify the "sister route" to the route concerned, wherein the traffic situations on these routes can be used under normal conditions to diagnose the traffic on the link concerned.

Historical measurement data on one route is used to define historical mean value curves for respective calendar days. These curves may, for instance, be comprised of $I_0$, $P_0$ curves.

The historical $I_{OH}$, $P_{OH}$ curves are used to determine the correlation between the links of different "sister routes" with regard to the size (β) of the correlation and the time shift (τ).

The relevant measurement values ($I_0$, $P_0$) of the day are related to the historical data of respective links. For instance, $\alpha=(I_{OH}-I_{OH})/I_{OH}$ form the normalized difference value between the values ($I_{OA}$) actually measured and the historical values. The calculations need not be proceeded with when these values are small for the links and associated traffic routes concerned and when there is normally no traffic problem. Otherwise, the correlation between the α-values for the "sister routes" is investigated to ascertain whether or not there is a significant change in the traffic situation of that day and therewith be able to take such changes into account.

If there is found an associative change on the sister routes, a change in the traffic situation can be expected over a large part of the city. If only one route deviates to any significant extent, a more local change can be expected, although this may fade out.

An Example of Predicting Flow on a Link B

The following example illustrates traffic prediction on a link B.

A limited number of sensors are available. One sensor is located on an upstream link C. Between C and B there are several traffic flow connections towards C and also traffic flow exits from the route. $L_1$ up to and including $L_1$ are the sister routes of the route concerned ($L_3$).

$\beta(L_3, L_1)$ and the $\tau(L_3, L_1)$, etc., are known for the links of the sister routes.

$\beta(C, B)$ and $\tau(C, B)$, i.e. corresponding relationship between the values in C and B along the same traffic route are also known.

Also available are present measurement values from respective sensors, which indicate that it would be of interest to proceed further, since the traffic flows are of a magnitude such that a traffic problem can be expected.

A prediction in B can be obtained from the measurement values obtained in C through the medium of a transfer factor W. Assistance can also be obtained from the sister routes ($L_1$–$L_4$) and from the historical and relevant measurement values in B, i.e. in total three different sources of information.

We discuss first the case in which B lacks the provision of a measurement sensor. We assume, however, that we have access to a measurement sensor downstream of B, i.e. on link A, or that a mobile sensor was earlier placed on B and has provided correlation values for historical data to the other two types of information source.

Assume that C is placed so far out on the periphery as to form one of the outermost sensors for detecting morning rush-hour traffic. Otherwise, the flow in C is predicted in a manner corresponding to the way in which the flow in B is predicted and a further outlying sensor may be found, etc.

Historical curves relating to C and corresponding links on the sister routes are correlated in accordance with historical values.

We discuss in the following simple approximative methods of forming the historical values of $I_0$ and the correlation factors β.

There is obtained from associated repetitive measurements on one link the value $X_i(t)$, and on another link the value $Y_i(t)$. The measurements may be taken once every ten minutes on ten consecutive Mondays, for instance. The mean value formed from these measurements will provide so-called historical curves $X_H(t)$ and $Y_H(t)$ illustrating how the measured traffic parameter varies over a typical Monday.

By forming $$\sum_i^N X_H(t_i)\cdot Y_H(t_i+\tau)=Z(\tau),$$

where $t_1$ to $t_N$ are chosen correlation periods, there is obtained from relevant correlation time $\tau$, where $Z(\tau)$ is maximum.

For $\delta X_i(t)=X_i(t)-X_H(t)$ and correspondingly for $\delta Y_i(t)$ there is formed $$\Gamma=\frac{\delta Y_i(t+\tau)}{\delta X_i(t)}=\frac{\delta Y_i(t+\tau)\cdot\delta X_i(t)}{[\delta X_i(t)]^2}$$

which provides a highly error sensitive system when $\delta X_i(t)$ is small.

Form instead $$\theta_c(t,\tau)=\frac{\sum_i \delta Y_i(t+\tau)\cdot\delta X_i(t)}{\sum_i [\delta X_i(t)]^2}$$

and $$\Gamma_c(\tau)=\frac{\sum_k\sum_i \delta Y_i(t_k+\tau)\cdot\delta X_i(t_k)}{\sum_k\sum_i [\delta X_i(t_k)]^2}$$

where $$X_H(t)=\frac{1}{N}\sum_i X_i(t),(\overline{X}_i(t)=X_H(t))$$

and the correlation coefficient $\beta(\tau)$ around the mean curves $X_H(t)$ and $Y_H(t)$ is $$\beta(\tau)=\Gamma_c(\tau)\cdot\frac{\sigma_x}{\sigma_y}$$

where $\sigma_x$ och $\sigma_y$ are standard means around $X_H$ and $Y_H$ respectively.

The correlation coefficient $\beta(\tau)$ has a maximum value of magnitude 1 when X and Y are fully correlated.

$$\Gamma_c(\tau)=\beta(\tau)\cdot\frac{\sigma_y}{\sigma_x}$$

also includes a set scale factor which is an expression that indicates traffic may be greater on the y-link than on the x-link. The correlation coefficient $\beta(\tau)$ calculated in accordance with the above may be small despite x and y being strongly correlated. This is because $\beta(\tau)$ is calculated around $X_H(t)$ and $Y_H(t)$, which take-up the strong correlation, and $\beta(\tau)$ therewith indicates that the traffic variations around $X_H(t)$ and $Y_H(t)$ may partly be random variations which do not depend on factors that are common to x and y.

Corresponding correlation coefficients for $X_H(t)$ and $Y_H(t+\tau)$ are calculated by forming the mean value of $X_H(t)$ and $Y_H(t+\tau)$ and calculating $\beta_H(\tau)$ around these mean values for selected correlation periods.

$Y_H$ can also be related to $X_H$ by forming $$\Gamma(\tau)=\frac{d\,Y_H(t+\tau)}{d\,X_H(t)}$$

The value of $\Gamma_{dH}$ over a longer time period is formed from $$\Gamma_{dH}(\tau)=\frac{\sum_i \frac{d_{YH}(t_i+\tau)}{dt}\cdot\frac{dX_H(t_i)}{dt}}{\sum_i\left(\frac{dX_H(t_i)}{dt}\right)^2}$$

In the calculation of $\beta_H(\tau)$ above, the maximum and minimum values of $X_H(t)$ and $Y_H(t+\tau)$ of the curves have been emphasized. The parameter $\Gamma_{dH}(\tau)$ instead emphasizes the time derivatives, the flanks on the $X_H(t)$ and $Y_H(t)$ curves. One method of amplifying the requirement of correlation is to use the derivative when this gives greater assistance and the amplitude when this gives greater assistance. In the case of a sine curve, the transition will then occur at $n\pi/4$.

If more sister routes can be correlated to the traffic route concerned, there is obtained correspondingly more measurement values of the X-type, coupled to the values y for the link concerned, and $\Gamma$ for the sum of the contribution of the sister links can be obtained from the equation $$\Gamma_s=\frac{\sum\Gamma_i\cdot\delta X_i}{\sum\delta X_i}$$

However, if some sister links have a higher correlation than others, these links should be given a higher weighting than when summating for $\Gamma_3$ above.

Set $$\delta X=X_i+X_2$$

$$\delta Y=Y_i+Y_2$$

$$\delta Y_1=k_1X_1$$

$X_1$ and $Y_1$ are correlated with the correlation coefficient 1 and $X_2$ and $Y_2$ are "noise variations", i.e. not correlated.

There is then obtained $$\beta=\frac{k_1\overline{X}_1^2}{(\overline{X}_1^2+\overline{X}_2^2)^{1/2}\cdot(\overline{Y}_1^2+\overline{Y}_2^2)^{1/2}}=\frac{1}{\left(1+\frac{1}{\left(\frac{S}{N}\right)_X^2}\right)^{1/2}\cdot\left(1+\frac{1}{\left(\frac{S}{N}\right)_Y^2}\right)^{1/2}}$$

where $$\left(\frac{S}{N}\right)_y^2=\frac{\overline{Y}_1^2}{\overline{Y}_2^2}$$

and $$\left[k_1=\Gamma_c\cdot\left(1+\frac{1}{\left(\frac{S}{N}\right)_x^2}\right)\right]$$

$X_2$ is often set equal to 0 in the Literature, there being obtained the equation $$\beta^2 = \frac{\overline{Y}_1{}^2}{\sigma_y{}^2} = \frac{\sigma_y{}^2 - \overline{Y}_2{}^2}{\sigma_y{}^2}$$

where $\beta^2$ is an expression which denotes how large a part of the variance in Y can be related to the dependency on X.

Since when making the correlation, it may be difficult to define just how much of the noise lies in X and in Y respectively, the whole of the noise can be allocated to the XY-correlation in accordance with $$\beta^2 = \frac{1}{1 + \frac{1}{\left(\frac{S}{N}\right)^2}}$$

$$\left(\frac{S}{N}\right)^2 = \frac{\beta^2}{1-\beta^2}$$

Within the vehicle traffic field, $\sigma^2$ is normally proportional to the mean value and the measurement time concerned. In view of this, it is possible to distribute noise in a stereotype fashion between X and Y, from $Y_1 = k_1 X_1$ according to $$\left(\frac{S}{N}\right)_x^2 = \frac{1}{k_1}\left(\frac{S}{N}\right)_y^2$$

and $$\left(\frac{S}{N}\right)_x^2 = \frac{\beta^2}{1-\beta^2} \cdot \frac{k_1+1}{k_1}$$

for large values of $\beta$.

The correlation coefficient $\beta$ can thus be expressed as a function of the signal/noise ratio on respective links corresponding to the values X and Y. The correlation can be improved by improving the signal-noise ratios.

When the sister links have different correlation coefficients, different signal/noise ratios, the measurement values will not preferably be added straight ahead, but that those values which have a better signal/noise ratio will preferably be weighted higher than the others.

Optimal weighting is effected by multiplying the X-values with a factor $$\alpha = \frac{\left(\frac{S}{N}\right)_x^2}{\left(\frac{S}{N}\right)_z^2}$$

in relation to a selected reference station, (Z).

The new signal/noise ratio will then be $$\left(\frac{S}{N}\right)_s^2 = \left(\frac{S}{N}\right)_x^2 + \left(\frac{S}{N}\right)_z^2$$

This weighting method also enables contributions to be obtained from weakly-correlated system links.

In the aforegoing, sister links were defined as links which have good correlation between respective traffic parameters. On the other hand, it is not certain that the deviations from the historical mean values of respective links are equally as well correlated. It is reasonable to assume that traffic will fluctuate randomly around respective mean values and that these fluctuations need not have their cause in a source which is common to several traffic routes. In the aforegiven expression $\delta Y = Y_1 + Y_2$, where $Y_2$ is one such random variation that cannot be predicted from the sister links. The best possible prediction is $Y_1 = k_1 X_1$, where $X_1 = \delta X - X_2$ and $X_2$ is unknown. When predicting $Y_1$, the contribution from $\delta X$ is obtained from $\alpha_1 \cdot k_1 \delta X = \alpha_1 k_1 (X_1 + X_2)$. Taken together it is predicted that $$Y_1 = \frac{\Sigma \delta Y + \alpha_i \cdot k_i \cdot \delta X_i}{\sum_i 1 + \alpha_i}$$

where standardization has been chosen with regard to $\delta Y$, which in the illustrated case symbolizes prediction from sensors on the same traffic route. The factor $k_i$ is often replaced in practice with $\Gamma_i$.

The mean values of the variations $X_2$ and $Y_2$ can be estimated from the traffic distribution function. When $\delta X$ is small, i.e. smaller than or roughly equal to the man value $X_2$, it is not worthwhile in practice to predict $\delta Y$ to anything other than $\delta Y = 0$, knowing that the mean variation is roughly $Y_2$. Lower limit values are obtained when selecting more sister routes. Nevertheless, it is important that $\delta Y$ can be practiced quickly when the measured value of $\delta X$ is large. A large value of $\delta X$ need not mean that $\delta Y$ becomes large. When several sister routes simultaneously give large $\delta X$-values, this indicates that a probability of a common change in the traffic is greater. The nature of this change may be unknown at the moment of making the prediction and a prediction of $\delta Y$ can nevertheless be made on the basis of the relationships between the different sister routes, which can be calculated from the measured values. It should be noted that the relationships now obtained may be different to the relationships earlier obtained and applicable to the more standardized $\delta X$-values.

When traffic on a road link increases towards saturation, i.e. towards link capacity, the traffic flow will increase slowly and when $\delta X$ and $\delta Y$ describe deviations in traffic flow (I), there is obtained another factor $k_1$ as the relationship between $Y_1$ and $X_1$. On the other hand, when $\delta X$ and $\delta Y$ denote traffic density (P), the traffic density P can continue to increase as a result of higher traffic pressure, even when the traffic approaches maximum capacity. At high traffic flows, vehicle density P can be a more suitable measurement of traffic than the traffic flow.

When predictions from, for instance, traffic on sister links show high traffic flows, close to saturation, on the link selected, it is appropriate to investigate the situation upstream of the link. The high traffic flow is most often the result of the combination of flows from two links, and the point at which these links merge or intersect is normally a narrow sector. If this is so, traffic will congest at the road-merging or road-junction point. Traffic speed falls and the flow decreases, resulting in tail-backs or queues on one or both of the part-flows. In this regard, the traffic flow at the road-junctions may be considerably lower than the capacity of the following or downstream link, and the flow on this link will be lower than the aforesaid first predicted flow. Traffic on the selected link may flow well, with a good speed. On the other hand, the traffic flows upstream of the entry roads may be much lower, due to traffic congestion.

The prediction of traffic flow on one link is not an isolated process, but requires continued analysis of the traffic flow both upstream and downstream of the link, in order to identify the risk of traffic building-up and therewith altering the first "primary" prediction.

Since it can be expected that not all links are equipped with sensors for economic reasons, there are required auxiliary functions which describe how traffic changes over a road section which includes exit and entry roads between two sensor-based links.

A transfer or propagation function W(X,t) describes how vehicle density (flow and speed) changes as a function of distance and time along a road section, for instance a change in the flows $I_1$ and $I_2$ from one measuring occasion at $(X_1,t_1)$ to a measuring occasion downstream at $(X_2,t_2)$. We also have functions $\phi(t)$ and $\theta(t)$ which describe changes at approach roads and exit roads. The traffic thins at road exit points by on mean the same factor. At approach or entry points, however, it can be expected that the traffic will need to adapt to the major road when entering from an approach road. As a result, the $I_2$-term should be smoothed-out slightly when traffic on the major road is high.

These functions (W(X,t), $\phi(t)$ and $\theta(t)$ can be calculated from measurements taken on concerned routes. If the exit and entry points are not equipped with sensors, predictions can be made by applying the same method as that described for sister routes, i.e. by making comparisons with equivalent exit and entry points.

When high traffic flows are measured on a traffic route in $(X_1,t_1)$, W(X,t) can describe disturbance growth and the increased probability of the formation of tail-backs and traffic congestions when traffic flows are close to the capacity of the route. These growth functions can be measured and plotted to predict traffic conditions downstreams of a link equipped with a measuring sensor.

In expressions of the kind $Y(Z_2, t_2)=W(Z, t)\cdot X(Z_1, t_1)$, we have earlier used the term $\Gamma$ instead of W to describe the prediction of Y at a point downstream of the measurement X. The term $\Gamma$ is obtained from assumptions of linear correlation between the values Y and X, or $\delta Y$ and $\delta X$.

The term W may be used more freely to describe a transformation of traffic from one place to another place at a time $(t_2-t_1)$ later on.

For instance, the flow term $I_2Z,t)$ can be given a continuous variable function where $I_2(Z,t)=W(Z,t)\cdot I_2(0,0)$.

In a first approximation for small t, W(Z,t) can be given a linear growth function where $W(Z,t)=(1+\alpha_a t)\cdot f(Z-vt)$.

When the flow of traffic $I_0$ on a traffic route approaches the capacity of the route, it can be expected that small $I_2$-termer will grow as functions of time and at a growth rate which is dependent on the factor $I_0/C$. The term W can then be comprised of a function $I_2(Z, t)$ which describes "disturbance" $I_2$ in movement along the route and a function $f_2(I_0, t)$ which describes growth of the disturbance. In the case of small time periods, the function $f_2$ can be approximated with a linear function, of t, i.e. $f_2=(1+\alpha_2 t)$, where $\alpha_2$ is a function of $I_0/C$. The function W(Z,t) which describes how "traffic disturbances" $I_2$ grow, can be defined by measuring $I_2$ along routes for different $I_0/C$. Corresponding functions or the $I_1$-term can be obtained in a similar fashion. Measurements can also identify those levels on $I_0$, $I_1$ and $I_2$ at which traffic congestions will normally occur, and consequently the function W is of interest in predicting traffic along traffic routes, particularly when there are not many sensors along the route. In this way, measurements carried out on a highly trafficated route can be used to predict risk locations along the route at which traffic congestions are likely to occur.

So that entries and exits can also be taken into account, measurements are made for defining $\phi(t)$ and $\theta(t)$. It is assumed in this regard that $\theta(t)$ will give a percentile thinning of the traffic, whereas the approach problems, and therewith the function $\phi(t)$ become more complicated.

$\phi(t)$ will in some cases generate congestions, particularly at high $I_0$-values on the route, and to some extent will also equalize existing $I_2$-variations, by adapting traffic to some extent at the approaches. $\phi(t)$ can be determined more easily and will provide a smoother flow on the route, when "ramp-metering" is applied at the approach.

It is of particular interest to identify by measurement those flow values on the route where there is a danger that the approach flow will result in traffic congestions.

The arrangement, or system, will now be described generally with reference to FIGS. 1 to 6.

FIG. 1*a* illustrates a simple model of a traffic control centre. In the case of large towns and cities, the traffic control centre will include a large number of operator sites and the control centres will be similar to those control centres used in National Defense systems, such as air defense control or marine control systems. These control systems are constructed to satisfy high demands on real-time performances and modern-day systems are comprised of distributed data processing architectures.

FIG. 1*a* illustrates some essential building blocks of the control centre. "Sensor communication" (4) receives sensor inforamtion from the road network and "Control means communication" (5) transmits resultant procedure information from the control centre. The "Operator" (2) fulfils an important function in the operation of the control centre. He/she inserts information concerning incidents and events reported to the control centre, so that the "Traffic model" (3) is able to take into account corresponding changes in the capacity of the roads, highway, etc. when calculating and predicting traffic flows. Relevant and predicted traffic situations may also be presented to the operator, who then makes a decision concerning the procedures or measures that should be taken.

Much of the historical information relating to the traffic on the different links of the road network at different times is stored in the "database" (1).

Those calculations of traffic parameters that are required to make relevant or current predictions are performed in the "traffic model unit". Since many calculations are required to predict traffic situations on a large road network, it is necessary that these calculations and predictions can be made very quickly. The predictions shall be updated successively and constantly kept current. The real-time requirement will be apparent in the application concerned, and the traffic model unit is constructed so as to provide quick access to local data areas, utilizing powerful computer capacity and a real-time operative system. Examples of building blocks in present-day technology are IBM's RS6000 and the AIX operative system, or SUN's corresponding Unix-package with Sparc-computer and Solaris.

Figure 1B:
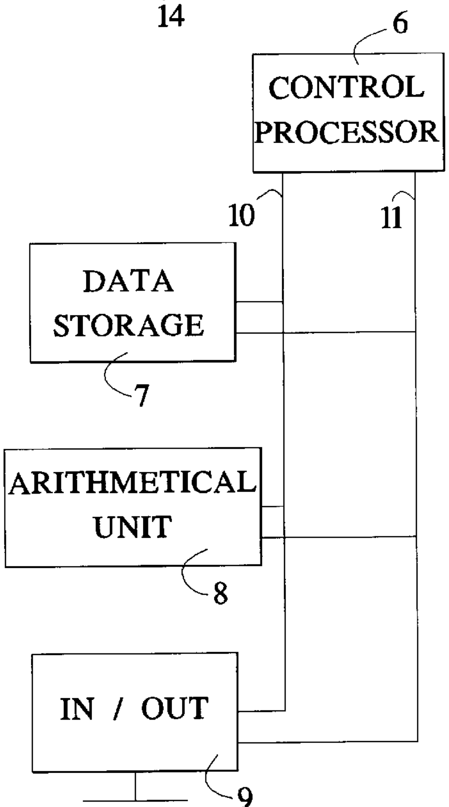

FIG. 1*b* illustrates an approximate structure of the processing unit, in which a control processor (6) communicates with the unit (7) through an address bus (10) and a data bus (11), wherein the unit (7) stores data used in the arithmetical unit (8) and wherein an In/Out unit (9) communicates with other units, for instance through the medium of a LAN.

Figure 2:
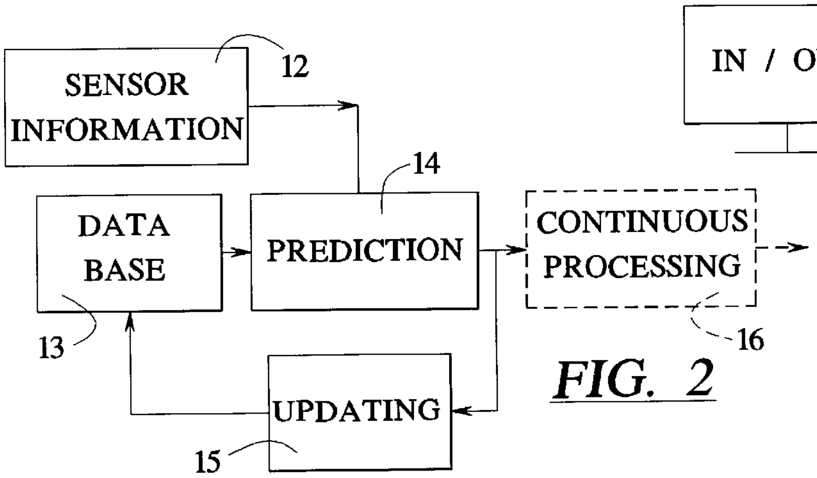
FIG. 2 illustrates data flow and functions for prediction and updating purposes.

FIG. 2 illustrates the information flow when Predicting and Updating between different functions blocks. These blocks relate to Sensor Information (12), shown in FIG. 3, Prediction (14), shown in FIG. 4, Updating (15) shown in FIG. 6, Database (13), in which large amounts of data system information are stored, and a block (16) which relates to continued procedures, such as Control or traffic related information. New measurement values obtained from the sensors are compared with earlier historical values which have been taken from the database to the local data area of the traffic model and new predicted traffic parameters are generated on which control decisions can be taken.

The new measurement values are also used to calculate new updated historical values and these values are stored in the data area concerned for immediate use, or alternatively are stored in the database for later use.

Figure 3:
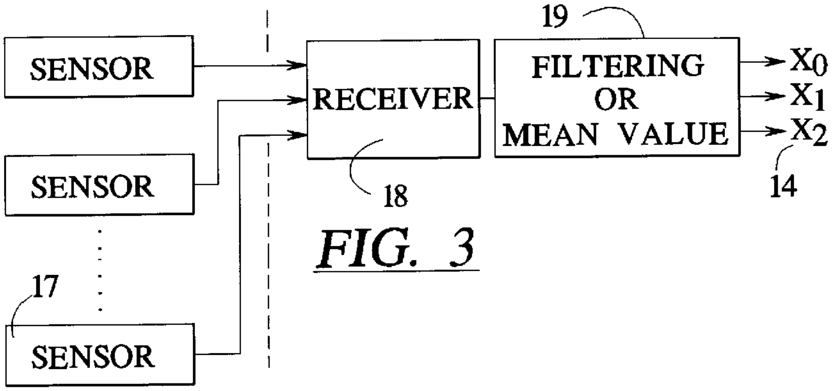
FIG. 3 illustrates sensor information delivered to the control centre.

As illustrated in FIG. 3, sensor information obtained from the road network sensors (17) are transmitted to the control centre and subsequent to being received (18) are either filtered (19) or the mean values of differently time-varying parameters are formed. These sensor information may consist of traffic flow, traffic density and/or traffic speed. The traffic parameters concerned are transmitted to the prediction function (14).

Figure 4:
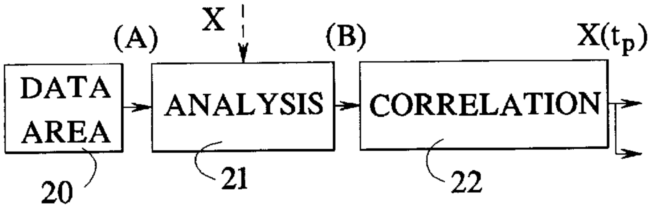
FIG. 4 illustrates prediction by a link in a first stage.

FIG. 4 illustrates a first stage of the prediction. Data is sent to Analysis I (21) from the Data area (20). According to one embodiment, this data consists of historical dat, $X_H$, capacity C, standard deviations $\sigma$ and status symbol, S. Processed measurement data is obtained from sensor information. Measurement data is compared with historical data in Analysis I and a decision is made as to whether or not the measurement values shall be further processed for prediction purposes. During the greater part of the day, the traffic density of the majority of road links is so low as to enable link times, mean speeds, etc., to be added to the basic values of respective lines. Consequently, it is important to sort out quickly those values which do not need to be further processed for prediction purposes. In a number of cases, it may be sufficient to make a comparison with a limit value, $X_c$, where $X<X_c$ denotes prediction according to a basic value.

On important routes, it is of interest to establish whether or not the measurement value lie within the statistical result $X_H-\alpha\sigma<X<X_H+\alpha\sigma$, where $\sigma$ is the variance and $\alpha$ is a chosen factor, for instance 1.7. A value which lies outside this interval may indicate an occurrence which requires separate analysis. If X lies beneath the interval, this may be due to traffic obstruction upstream of the link, and the status variable S is encoded for upstream links. The operator can be informed with a warning symbol and the link can be registered on a monitoring list.

If X lies within the current result range and the status variable has been encoded as "OK", the basic values are accepted as a prediction. Other examples of encoding S are S=0 "OK". Select the basic values.

S=1 Danger of disturbances in traffic on another route.

S=2 Danger of disturbances in traffic on the local route.

S=3 Serious danger of traffic disturbance.

S=4 Warning (set from another route).

Etc.

A more accurate analysis may be needed when S>0, for instance when an analysis shows that traffic approaches the capacity limit. When "Analysis I" indicates that a prediction calculation shall be carried out, additional information is introduced into "Calculation I", (22). Calculation I is supplied with further prediction values, namely the prediction factor and when appropriate the signal-noise ratio S/N for the prediction parameters. The result is a first traffic prediction based on the individual sensor information.

Figure 5:
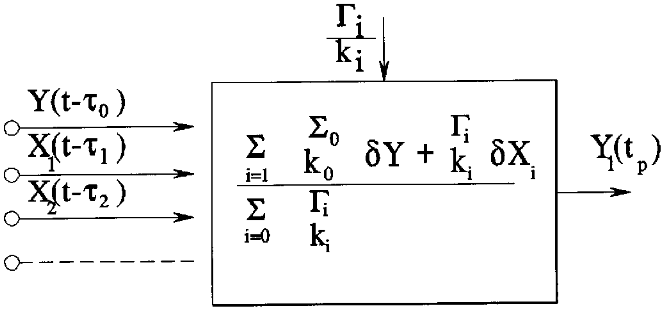
FIG. 5 illustrates prediction of several links in a subsequent stage.

Predicted link data obtained from several sources can be calculated in accordance with FIG. 5.

Figure 6:
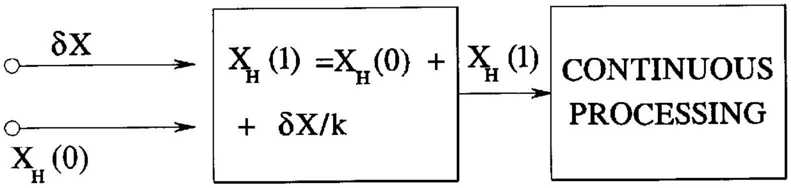
FIG. 6 illustrates updating of historical values $X_H$ in a database.

The value predicted for the link concerned $Y_1(t_P)$ is obtained from the measured values from the same route $Y(t-\tau_0)$ and the sister route $(X_1(t-\tau_1)$, $X_2(t-\tau_2)$, and so on. The values of respective routes are multiplied by the factor $\Gamma_i/k_i$ and are added to give the result $Y_1(t_p)$. The factor $k_i$ is the weighting factor which relates the contribution of each route to its signal/noise ratio or to some corresponding correlation coefficient. FIG. 6 shows that the preceding historical value $X_H(0)$ is updated by forming $\delta X$ from the difference between the current measurement value and the historical value, whereafter the new historical value is formed by adding $\delta X/k$ to the old value. The factor k determines the time constant for the length of time taken before a change in the measurement values results in a corresponding change in $X_H$. In this case, the historical value $X_H$ is not a mean value where a plurality of the measurement values have the same weight when forming a mean value, but that the factor k gives a greater weight to the present input values than the earlier values. The updating method is simple, since it is not necessary to save more than the current value.

Figure 7:
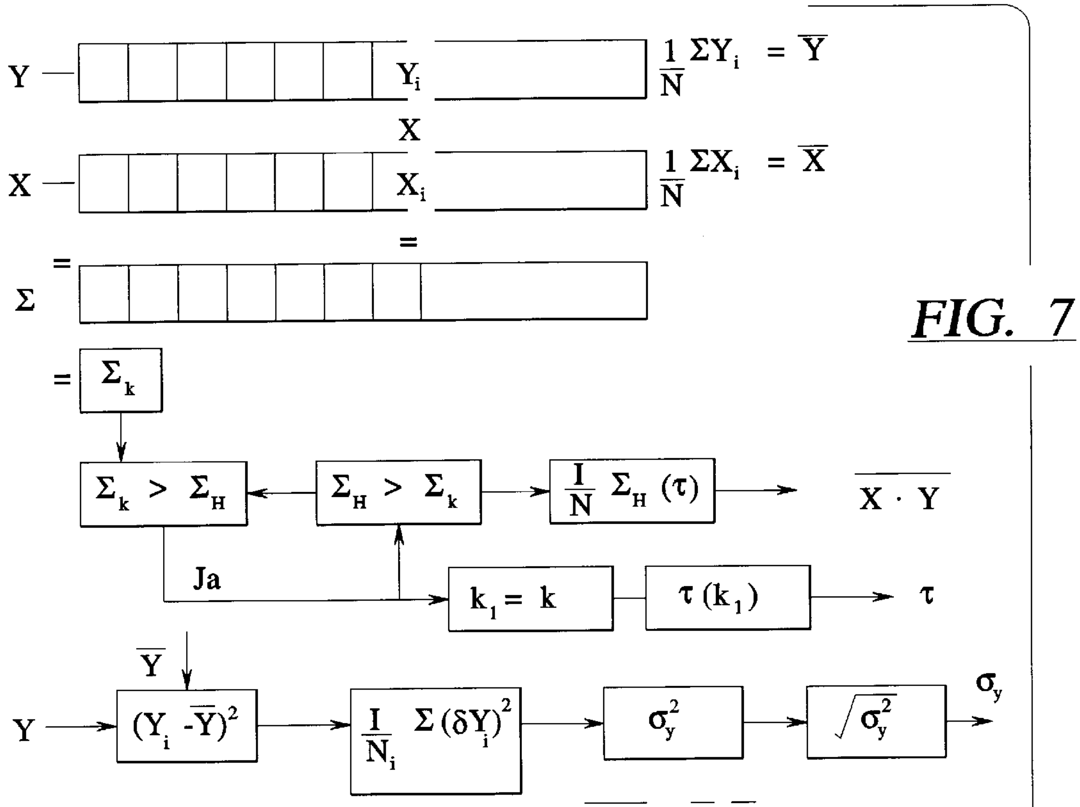
FIG. 7 illustrates how the traffic parameters can be processed to produce function values included in obtaining the correlation coefficient and the prediction factor.
Figure 8:
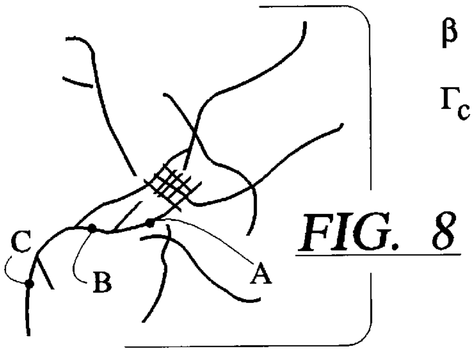
FIG. 8 is a simplified example of a road network which includes approach roads or entrances to a city centre.

FIG. 7 illustrates how the correlation coefficient and the prediction factor can be obtained from the signals X and Y. The top of the Figure shows the values of Y and X being inserted into a respective register. Corresponding values $X_i$ and $Y_i$ are multiplied together and new pairs for multiplication are obtained by shifting $X_i$ and $Y_i$ relative to one another. By successively shifting, multiplying and summating these values, there is obtained a series of values which have a maximum at displacement $\tau$ between the Y and the X values.

It has been assumed in the illustration that the changes in $\overline{X}$, $\overline{Y}$, $\sigma_x$ och $\sigma_y$ are small during the operation of the relative shifts of Y and X. In another case, the whole of the correlation coefficient $\beta$ can be calculated for each shift and the maximum $\beta$-value is sought to determine the $\tau$-value.

FIG. 7 also shows how statistical basic parameters are obtained for the parameters X and Y. The expression for correlation coefficient and correlation factor is repeated at the bottom of FIG. 7, to facilitate an understanding of the relationships between the parameters illustrated.

One reason for predicting traffic situations is to be warned of the risk of overloading or traffic congestion in good time, so that measures can be taken to avoid the predicted traffic congestions. Certain traffic congestions cannot be predicted and occur without warning. For instance, there may be a road accident, the engine of a vehicle may stall or a truck may lose its load and block the road. It is necessary to be able to detect this type of problem as soon as possible, and to be able to predict the new traffic situation that occurs and which may be influenced by procedures from traffic operators, police, and so on.

Detection of a new situation and the localization of the source of the disturbance are effected with information obtained from measuring sensors and by comparison with historical values. Normally, traffic upstream of the disturbance will become more dense while traffic downstream of the disturbance will become more sparse, and traffic located upstream exit roads to alternative roads will become more dense.

An alternative information source consists in external messages, such as telephone calls from drivers of vehicles, police, etc., information that an accident has occurred and passability on the route concerned is restricted to about X%.

When sensors are located both upstream and downstream of the incident, a direct measurement of the capacity at that time is obtained. A prediction of the new traffic situation can be made immediately, by initiating a number of activities with the aim of obtaining quickly a rough prediction which can be later refined as new measurement data successively enables better predictions to be made. The new traffic situation tends to stabilize after an initial dynamic happening or occurrence, and the prediction process then becomes simpler. Many disturbances resulting from minor traffic accidents, stalled engines, etc., block the route for less than 5–15 minutes, and the duration of the disturbance will depend on the traffic intensity at that time and the tail-backs that are formed and the time taken for these tail-backs to disappear. It is seldom that such disturbances will attain a stable phase, but should be treated entirely as belonging to the first dynamic period. The following examples illustrate how the arrangement or system operates to give predictions in current or prevailing situations.

Assume that a link is blocked to 100% by an incident. This situation is detected in accordance with the aforegoing and since there is generally found in the vicinity alternative routes, or detours, that the traffic can follow to circumvent the blocked link, a simple function can be used to make a first redistribution of the traffic which would otherwise have passed along the blocked link.

A cost measurement can be obtained for each examined route, with the aid of a "cost function" where travel time and possibly also parameters such as road distance and road size, etc., are added to cost parameters. The difference between the 1–3 best routes and remaining routes will normally be so great as to enable the remaining routes to be ignored in a first stage in which the traffic attempt to circumnavigate the incident on the alternative routes judged to be the best, which tends to result in an overload on the best alternative and successively increased traffic on the next best alternative, and so on.

The traffic is divided in the calculating unit of the arrangement in accordance with the above, so that when the best alternative route is loaded with so much extra traffic that its cost value increases, traffic is distributed to the next best route, and so on. When the traffic to be redirected is very considerable and the alternative route is already heavily trafficated, the first redistribution will predict the occurrence of tail-backs and traffic congestions, wherewith the traffic control operator is warned to this effect and may be given suggestions as to which measures or procedures should be taken, for instance measures which will inform motorists at an early stage, upstream of the blockage, through the medium of information, variable message signs, etc., redirecting the traffic to other routes.

If possible, the traffic flows should be kept at a safe margin from maximum capacity, to avoid traffic congestions. As before mentioned, it is very important to maintain traffic flows beneath traffic congestion limits. The road network will then be used to a maximum. Passability is considerably impaired when traffic congestions occur, and the capacity of the road network is reduced when it is best needed. If traffic redistribution does not suffice, the next best alternative is to slow down the traffic flows at suitable places upstream of the disturbance source. For instance, it is better for traffic to queue on an entry road in a suburban area than to allow traffic to approach the city or town centre, where queues would increase blocking of other important traffic routes where a high capacity is still more essential.

As the aforesaid first prediction is made by rough redistribution or rerouting of the traffic, the new traffic situation that arises is determined by existing sensors, and those sensors which are located at the beginning of the alternative routes provide information as to how the traffic flows are actually distributed. The measured values are used to correct the allocated traffic distribution and to predict the traffic on the alternative routes downstream of the sensors.

High frequency components of the type $I_2$, $P_2$ and $I_1$, $P_1$ are used to obtain the traffic distribution measurement values quickly. These parameters constitute characteristic traffic patterns and can be recognized along a route and also correlated with corresponding components of the primary route. The measurements are also able to show from this how much of the traffic on the primary route has elected to take respective alternative routes.

The control measures taken by the operator are coupled to the prediction unit of the system as supplementary information concerning an anticipated control effect or redistribution of traffic, and hence a new prediction is made with respect to these values. In the next stage, measurement values are obtained which disclose the actual traffic redistribution situation, whereafter a new prediction is made, and so on.

Particular attention is pad to the sensors located around the incident location, so as to be quickly aware of when the traffic begins to move on the earlier blocked link, whereafter traffic prediction returns to normal.

In the case of short-term incidents, the dynamic change in traffic can often be considered as local, i.e. the main change in traffic flow occurs within an adjacent restricted area around the incident. This area is comprised of a few links upstream of the incident and including exit roads for the best alternative routes, via the alternative routes to and including entry routes to the blocked route downstream of the incident. In the first approximation, traffic can then be considered to flow roughly as normal. There are a further two reasons why the traffic readapts downstream of the blocked link. Firstly, part of the traffic upstream of the blockage or incident have a destination on the actual route concerned, so that the best route selection is to return to the same route downstream of the incident. The other reason is because the alternative routes are heavily laden with traffic, causing traffic to endeavour to return to the blocked route, downstream of the blockage or incident and therewith utilize the better passability of this route.

If the final destination of all vehicles was known at each moment in time, it would be possible to calculate a more precise route selection for the individual vehicles concerned and the gathered traffic flows could be calculated for the new traffic situation. A valid O/D-matrix would be a good starting point in this regard.

Predictions can also be made more precise by assuming that the disturbances are, in the main, local and to construct databases for local traffic flow distribution. Components of the type $I_2$ and $I_1$ can be used in this regard, as previously mentioned. For instance, the measurement values on the link concerned can be correlated with the measurement values on different alternative routes downstream of the link, so as to obtain an assessment of the percentage of traffic flow on the link concerned divides onto respective alternative routes downstream of said link.

When an incident occurs on the link concerned, the "cost calculation" for alternative routes may take into account knowledge of downstream traffic distribution and therewith sometimes provide a better prediction of the traffic distribution on the alternative routes.

What is claimed is:

1. For a traffic system having routes formed by links, said links in combination forming a link network, a method for predicting a time-dependent value of a first traffic parameter at location Y in said system at time t from at least one time-dependent value of a second traffic parameter at location X in said system, the method predicting the traffic parameter at said location Y at said time t as a function of the traffic parameter at said location X at a time $\tau$ earlier than time t;

the method comprising the steps of:

(a) deploying various sensors at the measuring sites, each of the sensors generating a raw signal measuring traffic parameter at said location X as a function of said time $\tau$;

(b) filtering each raw signal through a lower frequency band-pass filter to obtain a respective low-frequency filtered signal from the associated raw signal, and (c) filtering each raw signal through a higher frequency band-pass filter to obtain a respective high-frequency filtered signal from the associated raw signal, and (d) from the low-frequency filtered signals, selectively calculating the traffic parameter at said location Y at said time t while predicting traffic at one of said routes from traffic on at least one other of said routes; and (e) from the high-frequency filtered signals, calculating the traffic parameter at said location Y at said time t while predicting near time traffic variation along a selected one of said routes.

2. For traffic management, information and control in a traffic system having a plurality of routes formed by links, said links in combination forming a link network, a method for determining values of traffic parameters utilizing sensor information obtained from sensors at different measurement sites in said link network, wherein a number of the sensors produce measurement values, from which are obtained at least two traffic parameters selected from the group consisting of traffic flow, traffic density and vehicle speed or alternatively link travel time, the method comprising:

predicting a time-dependent value of first traffic parameter Y, at a time t, from at least one time-dependent value of a second traffic parameter X, at a time $t-\tau$;

the first parameter Y and the second parameter X being selected from the parameter group consisting of traffic flow I, traffic densities, vehicle speed v, travel time and products and quotients thereof;

said sensors generating measurement values, from which said first parameter Y and said second parameter X are obtained as functions of time;

filtering a filtrant selected from the group consisting of said measurement values and values derived from said measurement values, obtained from a number of the sensors, through a frequency filtering process and thereby separating time-dependent variations of said filtrant into at least two frequency regions including first frequency region components exhibiting a first time variation and second frequency region components exhibiting a second time variation, said first time variation being faster than said second time variation, and from said first frequency region components and said second frequency region components obtaining at least two filtered components selected from the group consisting of high-frequency X components which comprise high-frequency components of said second parameter X, and high-frequency Y components which comprise high-frequency components of said first parameter Y, said high-frequency X components and said high-frequency Y components being obtained from said first frequency region components, and low-frequency X components which comprise low-frequency components of said second parameter X, and low-frequency Y components which comprise low-frequency components of said first parameter Y, said low-frequency X components and said low-frequency Y components being obtained from said second frequency region components, wherein the selected combinations of said filtered components each exhibit a covariance, respectively;

calculating a number of prediction factors employing covariance inherent factors for the selected combinations of said filtered components;

(a1) predicting near time traffic parameters on a first route of said plurality of routes, using said high-frequency X components on said first route and said calculated prediction factors from said selected combinations of high-frequency X components and said high-frequency Y components, on said first route to predict future high-frequency Y components on said first route; and selecting predicting future low-frequency Y components for at least one of (a2), (b), (c) and (d);

(a2) combining the predicted future high-frequency Y components from (a1) with selected low-frequency Y components;

(b) predicting future low-frequency Y components on one of said routes, using the low-frequency X components from at least one other of said routes, and said calculated prediction factor from the said selected combination of low-frequency Y components on said one of said routes and the low-frequency X components from said at least one other of said routes;

(c) predicting future low-frequency Y components from first average values of said second parameter X, where the said first average values are averages over time periods equivalent to low-frequency time periods of said low-frequency regions;

(d) predicting future low-frequency Y components from said second average values of said second parameter X, where said second average values are obtained from said first average values, representing a selected time period of the day, by averaging the values of said time period of the day for more than one day, the second averages being referred to as historical average values.

3. The method according to claim 2, further comprising (a) updating stored average values of said second parameter X, said first parameter Y and said prediction factors by the steps of:

storing an historical average value $X_H$ of said second parameter X and an historical average value $Y_H$, of said first parameter and the prediction factors in a data storage;

collecting the historical average values $X_H$ and $Y_H$ from the data storage;

generating updated values of said average values $X_H$ and $Y_H$ and said prediction factors by calculating new average values $X_H$ and $Y_H$ including at least one new second parameter X and at least one new first parameter Y obtained from new measured values from said sensors;

storing the updated values of said average values $X_H$ and $Y_H$ and said prediction factors in the data storage; and (b) predicting deviations from the historical average value $Y_H$ by the steps of:

calculating a deviation dX between at least on current value X obtained from the sensors and said average value $X_H$ and a deviation of dY between at least one current value of said first parameter Y obtained from the sensors and said average value $Y_H$;

calculating values of the new prediction factors from said deviations dY and dX;

updating and storing the new prediction factors;

predicting a future value of said deviation dY from said deviation dX and the new prediction factors;

predicting a future value of the first parameter Y by combining $Y_H$ and the predicted future value of the deviation dY.

4. The method according to claim 2, further comprising at least one step selected from the group consisting of:

determining a prediction factor $\Gamma$ directly as an expected value for a product of said second parameter X and said first parameter Y in relation to the expected value for a square of said second parameter X;

determining a prediction factor Γ for deviations of said first parameter Y from a mean value related to deviations of said second parameter X from the mean value, said prediction factor Γ being equal to $\beta^*\sigma_y\sigma_x$, wherein $\sigma_x$ and $\sigma_y$ are standard deviations for said second parameter X and said first parameter Y, respectively, and β is the correlation coefficient; and calculating a prediction factor Γ for a time derivative of said first parameter Y related to a time derivative of said second parameter X, by replacing said second parameter X with a first derivative thereof with respect to time and replacing said first parameter Y with a first derivative thereof with respect to time in all steps; and combining the prediction factors obtained using said first derivatives with respect to time with the prediction factors obtained using said second parameter X and said first parameter Y.

5. The method according to claim 2, further comprising the steps of:

obtaining and storing an historical average $X_H(0)$ of values of said second parameter X;

combining new values of said second parameter X, obtained from said sensors with said historical average $X_H(0)$ to obtain an updated historical average $X_H(1)$ according to an equation $X_H(1)=X_H(0)+(X-X_H(0))/k$, where k is a constant which determines sensitivity to changes;

storing said updated historical average $X_H(0)$; and successively applying said equation for successively updating and replacing $X_H(0)$.

6. The method according to claim 2, further comprising the step of:

predicting a Y-value of the first parameter Y from selected separate X-values of the second parameter X, by calculating and updating the separate X, Y prediction factors one by one, before combining the separate predictions of Y from each of selected, separate values of said second parameter X, respectively predicting a future value of said first parameter Y, and thereby obtaining a plurality of separate predicted values of said first parameter Y, by calculating and updating separate ones of said prediction factors individually, and subsequently combining said plurality of predicted values of said first parameter Y to obtain a final prediction of said first parameter Y.

7. The method according to claim 2, further comprising the steps of:

determining at least one of said prediction factors and at time shift τ between respective values of said second parameter X and said first parameter Y, when the correlation coefficient is at a maximum; and relating the time shift τ, when said second parameter X and said first parameter Y are defined at respective different selected positions along one route in said plurality of routes, to a time different selected positions along one route time estimate for travel between said selected positions.

8. The method according to claim 2, further comprising the steps of:

determining at least one of said prediction factors and a time shift τ between respective values of said second parameter X and said first parameter Y, when the correlation coefficient is at a maximum; and relating the time shift τ, when said second parameter X and said first parameter Y are defined respectively at selected positions on different routes in said plurality of routes, to a time difference comprising a traffic variation time difference estimate for traffic variations between said selected positions.

9. The method according to claim 2, further comprising:

calculating a first propagation function W(z,t) for a value X(z,t) of said second parameter X from measured values of sensors separated in a traffic propagation direction by a distance z and by a time t according to W(z,t)=X(z,t)/X(0,0), where X(0,0) is a starting value at z=0 and t=0;

defining a second propagation function $W2=f_1(t)^*f_2(z-v^*t)$ as a product of a time dependent function $f_1$, and a separate traffic propagation dependent function $f_2$, where growth and decay of W along the propagation direction is described by $f_1$, and the traffic propagation with a velocity v is described by $f_2$;

approximating W2 to W(z,t), including adapting $f_1$ to said measurement values, by using one of a least square method or by approximating he growth or decay of the measured values by a linear function, based on (1+αt), which is a small scale linearization |αt|<1, of an exponential large scale function, exp (αt), which is used for large |αt|;

using $W2=f_1^*f_2$to predict the traffic parameter X(z,t) along a route from said starting value X(0,0), according to X(z,t)=W2*X(0,0);

updating W2 to new traffic situations on selected routes by calibrating $f_1$ and $f_2$ against measurements from the sensors on said selected routes;

selectively calculating a third propagation function W3, obtained for a selected case where W3=W2, when adapted to measurements from sensors at several different routes, and using W3 for predicting traffic parameters along any of said plurality of routes where direct sensor data from the sensors are missing;

selecting using W2 for predicting variations in traffic parameter values during high traffic flows, close to maximum values, and congestion conditions.

10. The method according to claim 2, further comprising:

predicting the first parameter Y for a selected link according to the sensors on a selected number of different links including a link on the same route as the selected link, and a link on another routed identified as a sister route.

11. The method according to claim 2, further comprising:

obtaining a separate value XX of the second parameter X from each of a number of the sensors to obtain a plurality of values XX;

respectively predicting a separate prediction value YY of the first parameter Y from each separate XX-value to obtain a plurality of prediction values YY;

combining the prediction values YY to form a single prediction value of said first parameter Y at a selected position of said first parameter Y, in conditions where mutual correlations between the separate XX values;

applying weighting factors to the prediction values YY, in combining the prediction values YY to form said single prediction value of said first parameter Y;

relating the weighting factors to squares of signal-to-noise ratios, $(S/N)^2$, for the respective prediction values YY, with N being a difference between values of said first parameter Y obtained from the sensors in reality and the prediction values YY for a same position and time;

selectively approximately $(S/N)^2$ with $R_1^*\beta^2/(1-\beta^2)$, where β is a separate correlation factor for said first parameter Y and the separate value XX from which it was predicted, and $R_1$ is a correction factor dependent on noise referred to the separate values XX, with $R_1=1$, when noise is referred to only to the prediction values YY.

12. The method according to claim 2, further comprising the steps of:

identifying routes among said plurality of routes as being sister routes and comparing respective predictions at said sister routes;

identifying at least one of said sister routes on which said predictions significantly differ from said predictions on other sister routes, indicating an unusual traffic situation on said at least one of said sister routes; and executing at least one of:

triggering detection alarms;

triggering predetermined activities;

predicting the unusual traffic situation in the said at least one of said sister routes, by predicting the first parameter Y from the second parameter X on said at least one of said sister routes.

13. The method according to claim 2, comprising the step of predicting from the second parameter X the first parameter Y at a same link or spot as a link or spot where said second parameter X is defined.

14. The method according to claim 2, further comprising the steps of:

calculating a growth function U(t) including at least one growth factor selected from the group consisting of exponential exp $t/\tau$ and linear $t/\tau$ growth factors from measurements on growth or decay of traffic parameters at selected parts of the traffic system;

measuring respective time constants $\tau$ for said growth factors under different circumstances and for different ratios of I/C values, where I is a flow value related to C and C is capacity values for I comprising a maximum possible flow value for I;

using the time constants $\tau$ for predicting a traffic course produced by traffic-affecting events selected from the group of events consisting of a traffic jam, an accident and a public gathering, each of said events having a growth factor (U(t) associated therewith;

predicting a traffic course produced by a new occurrence of an event in said group, by means of interpolating or extrapolating U(t) for one of said events in said group to said new occurrence of an event;

updating and storing U(t) for at least one new occurrence of an event as said at least one new occurrence of an event occurs.

15. The method according to claim 2, further comprising the steps of:

identifying a nearest entrance link upstream of a selected link among said links;

using said traffic parameters determining conditions for traffic on the selected link reaching a capacity value;

determining if the entrance link implies a narrower section for the traffic flow than the selected link;

determining a risk of traffic jam dependent on at least one of connecting flows, and vehicles from different connecting flows weaving by a common flow into the selected link;

analyzing effects of said traffic jam at the selected link, on traffic at neighboring upstream and downstream links; and predicting the traffic parameters downstream of the traffic jam.

16. The method according to claim 2, further comprising the steps of:

controlling traffic by executing traffic control actions dependent on a first prediction of said traffic parameters, and, making a second prediction of a response to said traffic control actions, using stored results from earlier events, when said traffic control actions were performed;

calculating a correlation between each selected predicted response to said traffic control actions and actually measured traffic parameters from the sensors occurring as a result of said traffic control actions;

updating and storing a list of selected responses selected from the group consisting of predicted responses, measured responses, and combinations of predicted responses and measured responses to respective traffic control actions including values on prediction accuracy dependent on said correlation;

updating and storing average values selectively combined with variances of the responses and relations among responses for the respective traffic control actions;

using the list of responses related to the respective traffic control actions for implementation in future traffic situations.

17. The method according to claim 2, further comprising the steps of:

predicting said traffic parameters, when a short time incident partly or totally blocks a link, and where the incident can be reported by means of external sources or detected by sensors;

using sensors including at least one of a sensor downstream of the incident and a sensor upstream of the incident;

indicating a possible incident by the downstream sensor presenting a relative abrupt decreased of traffic flow;

estimating a new incident reduced capacity value indicative of traffic flow maximum from new traffic flow measures;

identifying exit routes upstream and entrance routes downstream of the incident within a limited local area around an incident location;

determining exits and entrances for alternative routes around the link of the incident;

ordering said alternative routes by means of valuating a cost function for each route, including selective costs of travel-time, route length, and road-size;

predicting a traffic distribution according to a principle of filling a first best alternative route with traffic until the costs are increasing due to heavy traffic or queues, whereafter a second best alternative route also is filled with traffic until the costs for said second best alternative route are increasing;

successively repeating said principle, for further alternative routes in order by, increasing the traffic successively on each of said alternative routes, while balancing the costs of traffic at the same level for the different alternative routes;

making measurements of traffic to obtain actual traffic distributions on the alternative routes; and updating the traffic predictions along the alternative routes according to the traffic measurements.

18. The method according to claim 17, wherein the step of ordering said alternative routes further comprises directly choosing measurements from the alternative routes for the new traffic distribution prediction.

19. The method according to claim 2, further comprising the steps of:

calculating values of said first high frequency X to component for values of said second parameter X, obtained from measurements by said sensors on a selected link and on each of connected downstream alternative links;

correlating said calculated values of said high frequency X component from the selected link, with the respective calculated values of said high frequency X component, and thereby obtaining correlation values, from the downstream alternative links to determine a first traffic distribution at the different downstream alternative links due to the traffic at the selected link; and predicting a second traffic distribution, subsequent to said first distribution using said correlation values.

20. The method according to claim 2, further comprising using said high frequency Y component in the steps of:

determining a traffic distribution from a selected link to a number of downstream alternative routes, by using a correlation between the selected link and each of said alternative routes;

selectively storing and using said traffic distribution for rerouting traffic at incidents;

defining alternative routes matching an existing traffic distribution downstream of an incident; and predicting initially a traffic distribution on each of said alternative routes.

21. The method according to claim 2, further comprising the steps of:

providing traffic prediction for a selected one of the links from measurement values from another one of the links;

calculating a predicting using at least one of said low frequency X component and said low frequency Y component traffic parameter;

adding first frequency components $I_2(I_0,C)$ obtained from second values of traffic parameter relations, where $I_2$ is a first frequency traffic flow component, $I_0$ is a second frequency traffic flow component and C is a capacity value, equal to a maximum flow value;

determining $I_2$ by at least one of:

obtaining $I_2$ from measurements of traffic parameters on the selected link; and estimating $I_2$ from standard deviations, $\sigma$, of traffic variations from the $I_0$ value during time periods $T_2$, where $T_2$ is related to the period of the first frequency component;

providing predicted traffic flow values I, where I is a combination of said traffic flow values $I_0$ and $I_2$; and judging risks for traffic congestions by comparing the predicted traffic flow values with criteria for traffic jam.

22. The method according to claim 2 further comprising:

estimating a prediction accuracy of at least some of said prediction factors, in terms of a correlation factor, using the medium of said covariance in calculating the correlation factor associated with the selected combination of filtered X and Y components with the time difference $\tau$, inherent in the covariance, being a correlation time.

23. The method according to claim 2, further comprising:

predicting traffic Y at a selected sub-area of the link network from measured traffic X in at least one neighboring sub-area;

selecting a number of selected sensors at various measuring sites in the said neighboring sub-area;

calculating prediction factors for selected X, Y combinations, related to the said selected sensors;

predicting Y from selected values of X and respective said prediction factors;

combining the predictions of Y from the selected values of X.

24. A method as claimed in claim 2 wherein each of said steps (a1), (a2), (b), (c) and (d) produces a respective prediction result, and said method comprising the additional step of combining at least two of said respective results to obtain a final prediction result.

25. A method as claimed in claim 2 comprising the additional steps of:

obtaining a least two different respective sets of said second parameter X using measurement values respectively from at least two different one of said sensors; and predicting said first parameter Y by combining said sets of said second parameter X.

26. A method as claimed in claim 25 wherein each combination of said sets of said second parameter X produces a prediction of said first parameter Y, and comprising the additional step of producing a final prediction of said first parameter Y by combining the predictions of said first parameter Y respectively obtained using said respective sets of said second parameter X.

27. A method as claimed in claim 2 comprising the additional steps of:

obtaining at least two different respective sets of said second parameter X using measurement values respectively from at least two different one of said sensors at respective different measuring sites; and predicting said first parameter Y by combining said sets of said second parameter X.

28. A method as claimed in claim 2 wherein each of said steps (a2), (b), (c) and (d) produces a predicted low frequency Y component, and comprising the additional step of producing a final prediction of said low frequency Y component by combining at least two of said predicted low frequency Y components.

29. A method as claimed in claim 2 comprising the additional step of producing a final predicted high frequency Y component by combining at least two predictions of high frequency Y components obtained respectively using sets of said second parameter X obtained from different ones of said sensors.

30. A method as claimed in claim 2 comprising additional step of predicting a plurality of different sets of said first parameter Y respectively representing different localizations of said link network, using a single value of said second parameter X.

31. A method as claimed in claim 2 comprising the additional step of predicting respective values of said first parameter Y, respectively representing at least two of said links, by combining predictions of said first parameter Y obtained for each of said at least two of said links.

* * * * *

UNITED STATES PATENT AND TRADEMARK OFFICE
CERTIFICATE OF CORRECTION

PATENT NO. : 5,822,712
DATED : October 13, 1998
INVENTOR(S) : Kjell Olsson

It is certified that error appears in the above-identified patent and that said Letters Patent is hereby corrected as shown below:

In column 1, line 13, change "enables" to --enable--.
In column 4, line 23, change "influences" to --influence--.

In column 7, line 13, change "from" to --the--.
In column 9, line 42, cancel "that".

In column 11, line 46, change "$I_2$-termer" to --$I_2$-terms--.
In column 14, lines 25-26, change "summating" to --summing--; in line 30, change "och" to --and--; and In column 15, line 38, change "trafficated" to --trafficked--.

In column 16, line 15, change "pad" to --paid--; in line 27, delete "a" preceding "further"; and in line 51, change "divides" to --divided--.

In column 18, line 51, change "on" to --one--.

In column 19, in line 56, delete "different selected positions" and substitute --difference comprising a-- therefor; and in line 57, delete "along one route"; in line 49, change "at" to --a--.

In column 20, in line 34, change "selecting" to --selectively--; in line 41, change "routed" to --route--; in line 53, insert --exist-- after "correlations"; and in line 61, change "approximately" to --approximating--.

In column 22, line 27, change "decreased" to --decrease--; in line 36, change "valuating" to --evaluating; and in line 59, delete "first" and "to".

UNITED STATES PATENT AND TRADEMARK OFFICE

CERTIFICATE OF CORRECTION

PATENT NO. : 5,822,712

DATED : October 13, 1998

INVENTOR(S) : Kjell Olsson

It is certified that error appears in the above-identified patent and that said Letters Patent is hereby corrected as shown below:

In column 23, line 21, insert --a-- preceding "traffic"; in line 24, change "predicting" to --prediction--; and in line 55, cancel "the" preceding "said".

In column 24, line 30, change "one" to --ones--; and in line 45, insert --the-- preceding "additional".

Signed and Sealed this

Eleventh Day of April, 2000

Attest:

Q. TODD DICKINSON

Attesting Officer

*Director of Patents and Trademarks*